FIG. 1

INVENTOR.
*LEIGHTON LEE II*
BY
*Lester W Clark*
AGENT

June 1, 1948.　　　　　L. LEE, 2D　　　　　2,442,419
CONTROL APPARATUS FOR INTERNAL-COMBUSTION ENGINES
Filed Nov. 9, 1944　　　　　　　　　　　5 Sheets-Sheet 2

INVENTOR.
*LEIGHTON LEE II*
BY
*Lester W Clark*
AGENT

June 1, 1948.  L. LEE, 2D  2,442,419
CONTROL APPARATUS FOR INTERNAL-COMBUSTION ENGINES
Filed Nov. 9, 1944  5 Sheets-Sheet 4

INVENTOR.
*Leighton Lee II*
BY
*Lester W Clark*
AGENT

Patented June 1, 1948

2,442,419

UNITED STATES PATENT OFFICE 2,442,419

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application November 9, 1944, Serial No. 562,715

26 Claims. (Cl. 123—119)

The present invention relates to apparatus for controlling internal combustion engines, and particularly to apparatus for controlling the supplies of fuel and air to such an engine, and for controlling the ignition timing on such an engine.

It has previously been proposed to control the throttle of an internal combustion engine so as to maintain a constant intake manifold pressure. The ultimate object of such control systems is to maintain a horsepower output proportional to the engine speed. Such systems have been found to have several inherent disadvantages.

Among these disadvantages are the inaccuracy or inoperativeness of such systems at low engine speeds, due to a phenomenon known as "boost reversal." "Boost reversal" means that the intake manifold pressure increases with decreasing speed when the engine speed falls below a certain value. This phenomenon is caused by the fact that the intake and exhaust valves are overlappingly open in modern high speed internal combustion engines, and at low engine speeds back pressure from the exhaust is communicated to the intake manifold, thereby increasing the pressure in the intake manifold.

Another error inherent in intake manifold pressure responsive power control systems is that they do not take into account variations in engine power output caused by variations in exhaust back pressure.

In order to overcome these disadvantages, I have provided a system which responds to brake mean effective pressure, and controls the throttle of the internal combustion engine in order to maintain a substantially constant brake mean effective pressure.

Brake mean effective pressure may be defined as a hypothetical pressure which, working on an area equal to the total piston area over a distance equal to the piston stroke times the number of power strokes per minute, would produce the brake horsepower output of the engine.

As a measure of the brake mean effective pressure, I propose to utilize the mass of the charge supplied to the cylinder per stroke. The mass of charge per stroke varies directly with the mass of air flowing to the engine per unit time and inversely with the speed of the engine. I therefore use the mass of combustion air flowing to the engine per unit time and the speed of the engine combined to provide a measure of the brake mean effective pressure. I provide means whereby any desired value of brake mean effective pressure may be manually selected.

An object of the present invention is to provide improved means for controlling the flow of fuel and combustion air to an internal combustion engine.

Another object of the present invention is to provide control apparatus for an internal combustion engine whereby a particular value of brake mean effective pressure (B. M. E. P.) may be selected by means of a manual control device, and that value of B. M. E. P. will thereafter be automatically maintained regardless of variations in engine speed and load.

Another object of the invention is to provide means responsive to the speed of an internal combustion engine and to the rate of flow of combustion air to the engine for controlling the throttle to maintain a selected value of B. M. E. P.

A further object is to provide means for coordinating the ignition timing with the brake mean effective pressure of an internal combustion engine.

A further object of the present invention is to provide, in the fuel supply system for an internal combustion engine, improved means for controlling the fuel flow under idling conditions.

A further object is to provide improved means for maintaining a substantially constant ratio of fuel-to-air in an internal combustion engine regardless of variations in the pressure and temperature of the combustion air.

Other objects and advantages of the present invention will become apparent from a consideration of the appended specification, claims and drawing, in which

Figure 1:
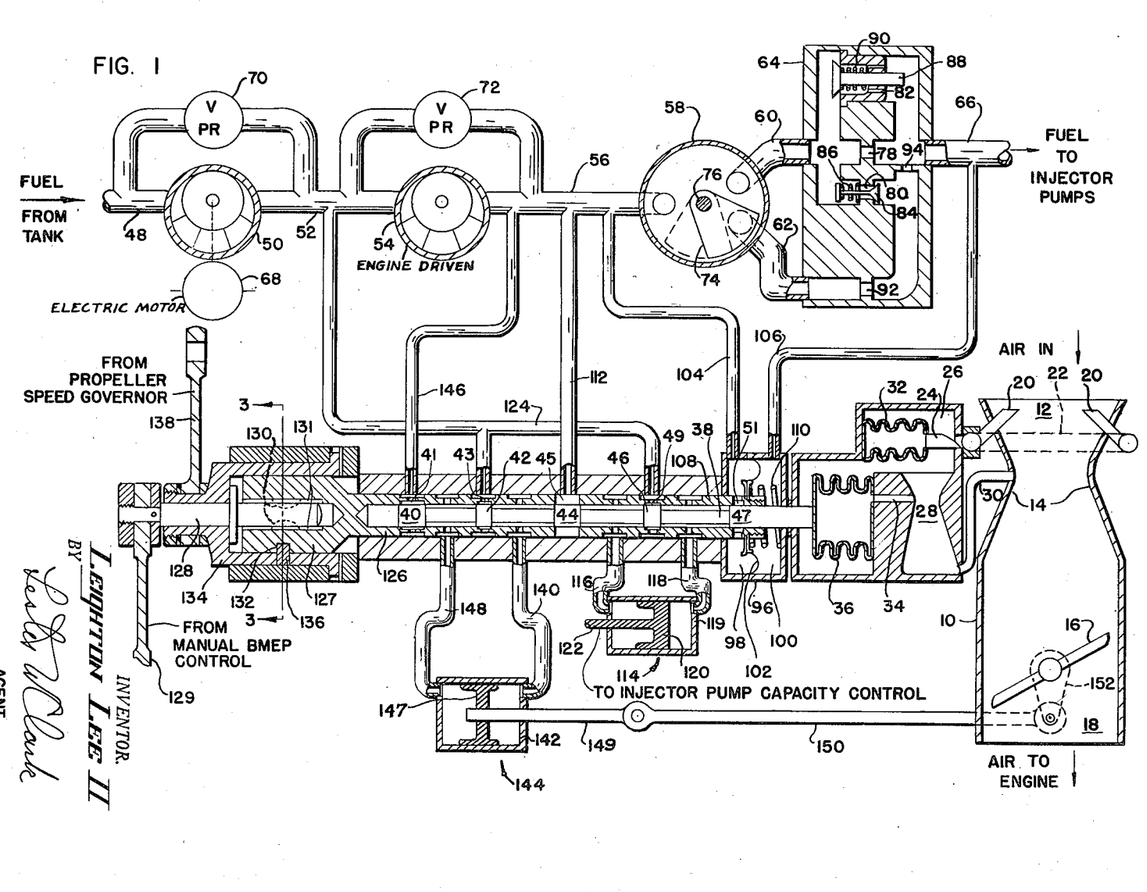
Figure 1 illustrates, somewhat diagrammatically, apparatus for controlling the supply of fuel and combustion air to an internal combustion engine in accordance with the principles of my invention.

*Figure 1*

There is shown at 10 an air induction conduit having an entrance 12, a Venturi restriction 14, a throttle 16, and an outlet 18.

A portion of the air entering the conduit 10 flows thru a plurality of impact tubes 20, whose ends are open to receive the impact of the flowing air. From the impact tubes, this air flows thru a passage 22 interconnecting the impact tubes, and thence past a valve 24 into a chamber 26. From the chamber 26 the air flows thru a boost venturi 28 and thence thru a conduit 30 to the throat of venturi 14.

The pressure differential set up by air flowing thru the main venturi 14 produces a flow of air thru the passage just traced, which includes the boost venturi 28. The valve 26 is positioned by a sealed bellows 32. This bellows 32 preferably contains a temperature responsive fluid, so that the position of valve 24 is determined by both the pressure and the temperature of the air in chamber 26. By the operation of valve 26, the air pressure differential set up between the entrance and throat of the boost venturi 28 is corrected to produce a true measure of the mass of air flowing per unit time thru the conduit 10. The action of the bellows 32 and valve 24 as a pressure and temperature compensator is more fully described and claimed in the co-pending application of Harold F. Twyman, Serial No. 486,599, filed May 11, 1943, and now Patent Number 2,391,755.

The pressure at the throat of boost venturi 28 is communicated thru a passage 34 to the interior of a flexible bellows 36. The bellows 36 is located in an extension of chamber 26, so that its exterior is exposed to the pressure at the entrance to the boost venturi 28. The free end of bellows 36 is therefore positioned in accordance with the pressure differential set up in the boost venturi 28, and its position is consequently a measure of the mass of air flowing thru the air induction passage 10, per unit time.

The free end of bellows 36 is attached to and positions an elongated spool valve 38 having five lands 40, 42, 44, 46, and 47, cooperating with ports 41, 43, 45, 49, and 51, respectively.

Figure 2:
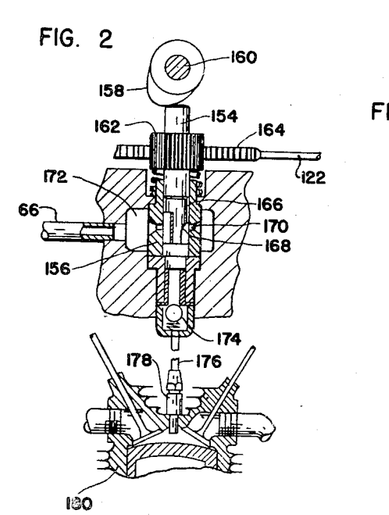
Figure 2 is a cross-sectional view of the fuel injection pump which may be controlled by the apparatus of Figure 1.
Figure 3:
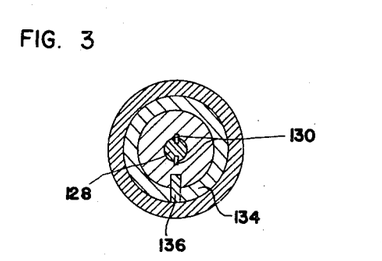
Figure 3 is a cross-sectional view taken along the line 3—3 of Figure 1, looking in the direction of the arrows.

Fuel for the engine comes from a tank or other source not shown and passes thru a conduit 48, a pump 50 of the rotary sliding vane type, a conduit 52, another rotary pump 54, a conduit 56, a mixture control unit 58, conduits 60 and 62, a jet system 64, and a conduit 66 to a set of fuel injection pumps for the cylinders of the engine. A common form of fuel injection pump is illustrated in Figure 2.

The pump 50 is driven by an electric motor schematically indicated at 68. The pressure at the outlet of pump 50 is regulated by a pressure relief valve shown diagrammatically at 70. The pump 54 is preferably driven by the engine. The outlet pressure of the pump 54 is likewise controlled by a pressure relief valve schematically indicated at 72. The relief valves 70 and 72 may be of the type shown in the patent to Storch et al. No. 2,157,089, in which a by-pass valve is provided to allow fuel to pass thru the valve toward the engine when its associated pump is not functioning.

The mixture control unit 58 includes a disc valve 74 attached to a shaft 76. When the valve 74 is in the position shown in full lines in the drawing, fuel may flow from the mixture control unit to the jet system only thru the conduit 60. When the disc valve 74 is in the dotted line position shown in the drawing, fuel can flow from the mixture control unit to the jet system thru both the conduits 60 and 62. The full line position of the mixture control is known as the "lean" position, while the dotted line position is known as the "rich" position. The valve 74 may also be moved to a position wherein both the conduits 60 and 62 are closed, which is known as the "cut-off" position.

Fuel entering the jet system 64 thru the conduit 60 may pass thru either of three jets or restrictions 78, 80 and 82 in the jet system. The restriction 78 is of fixed cross-sectional area. The opening thru the jet 80 is controlled by a valve 84, hereinafter termed an "enrichment valve." The valve 84 is biased to closed position by a spring 86 and is movable in an opening direction by the fuel pressure differential across the jet system whenever that pressure differential exceeds a value determined by the characteristics of spring 86 and the area of the valve seat.

The opening thru jet 82 is controlled by a valve 88 biased to open position by a spring 90. The valve 88 is moved toward closed position by the fuel pressure differential when the latter exceeds a value determined by the characteristics of spring 90. The restriction 82 is open only at low fuel pressure differentials, and is known as the "idle jet."

Fuel entering the jet system thru conduit 62 flows thru a fixed restriction 92. Fuel passing thru the restrictions 80 and 92 also passes thru a limiting restriction 94 before leaving the jet system thru the conduit 66.

For a given fixed cross-sectional area of the path open to the flow of fuel thru the jet system 64, the fuel pressure differential across that system is a measure of the flow of fuel.

The valve 38 passes thru the center of a casing 96 which is divided into two expansible chambers 98 and 100 by a flexible diaphragm 102. The fuel pressure in the conduit 56 upstream from the jet system 64 is communicated to the chamber 98 thru a conduit 104. The fuel pressure in the conduit 66 downstream from the jet system 64 is communicated to the chamber 100 thru a conduit 106. The diaphragm 102 is attached at its center to an elongated cylindrical seat member 108, thru which ports 49 and 51 extend radially. A spring 110 biases the diaphragm 102 and the seat member 108 to the left, as viewed in the drawing.

The valve 38 and seat member 108 cooperate to control the flow of fuel from conduit 56 either thru conduit 104, port 51 and a conduit 118 to the right end of a cylinder 119 in a piston type fluid motor generally indicated at 114, or thru a conduit 112, port 45 and a conduit 116 to the left end of the cylinder 119 in the fluid motor 114.

The piston 120 of fluid motor 114 is connected by a rod 122 to a mechanism for controlling the capacity of the injector pumps, which may be the rack 164 illustrated in Figure 2.

The operation of valve 38 and seat 108 is such that when fuel is supplied to one end of the cylinder 119, fuel is drained from the opposite end at the same time thru a conduit 124 to the conduit 52 on the inlet side of pump 54.

The ports 41 and 43 extend radially thru another elongated cylindrical seat member 126. The port 45 is formed by the space between the adjacent ends of seat members 108 and 126. The left end of the seat member 126 is enlarged and is provided with an internal bore extending inwardly from its left end. A shaft 128 extends into this bore. The shaft 128 is connected to the seat member 126 by a pair of Woodruff keys 130, which slide in keyways 131 in the seat member so that seat member 126 rotates with shaft 128 but is movable longitudinally with respect to it.

The outer surface of the enlarged left end 127 of seat member 126 is provided with a helical groove 132. The end 127 is surrounded by a cup 134 which carries a pin 136 extending into the helical groove 132. The cup 134 is rotatable by means of an arm 138 connected to the propeller speed governing mechanism, so that the angular position of cup 134 is a measure of the engine speed.

It may be seen that upon rotation of arm 138, the pin 136, riding in the groove 132, causes a longitudinal movement of seat member 126. The construction is such that a movement of arm 138 in a direction indicative of increasing speed causes a movement of seat member 126 to the right. It may also be seen that a rotation of shaft 128 by means of manual control lever 129, while the arm 138 is held stationary, will likewise cause a longitudinal movement of seat member 126 by the cooperation of pin 136 and groove 132. The device is so constructed that a movement of lever 129 in a direction indicative of increased brake mean effective pressure causes a movement of seat member 126 to the right.

The seat member 126 cooperates with lands 40, 42 and 44 on the valve 38 to control the flow of fuel from conduit 56 either thru conduit 112 and a conduit 140 to the right end of a cylinder 142 in a fluid motor 144 or thru conduits 146 and 148 to the left end of cylinder 142. The fluid motor 144 has a piston 147 which is connected thru a rod 149 and a link 150 to an arm 152 attached to the shaft of throttle 16.

*Figure 2*

There is illustrated in Figure 2 a common form of injection pump used with internal combustion engines. The pump illustrated is for a single cylinder, and a set of such pumps is usually provided, corresponding in number to the number of cylinders in the engine. The pump includes a plunger 154 which is reciprocated in a cylinder 156 by means of a cam 158 acting on the upper end of the plunger. The cam 158 is fixed on a shaft 160 which is rotated by the engine. A pinion gear 162 is attached to the plunger 154 near its upper end, above the cylinder 156. The pinion gear 162 cooperates with a rack 164 operated by the piston rod 122 of Figure 1. The lateral surface of the pump plunger is cut away, as indicated at 166. One end of the cut-away portion is provided with a generally helical contour, shown at 168. The cut-away portion 166 of the plunger 154 cooperates with ports 170 which extend thru the cylinder 156 to a chamber 172 in communication with the fuel conduit 65.

When the ports 170 are completely covered by the raised portions of the lateral surface of plunger 154, a pressure is created on the fuel below the piston, and the pump discharges thru a check valve 174 and a conduit 176 to an injector nozzle 178 located in one of the cylinders 180 of the engine. As soon as the cut-away portion 166 uncovers one of the ports 170, the pressure ahead of the pump plunger is relieved, and pumping ceases. It may, therefore, be seen that by virtue of the helical contour 168, the effective length of the pumping stroke may be varied by rotation of the plunger 154, which is accomplished by movement of rack 164.

*Operation of Figures 1 and 2*

By manipulation of the manual control lever 129, the operator of the engine may set the value of brake mean effective pressure which he wishes to maintain. Under normal conditions, this pressure would be selected at the value which corresponds to the highest efficiency. The arm 138 is connected to the propeller speed governor so that its position is a measure of the engine speed. The manual lever 129 and the arm 138 cooperate, as previously explained, to set the position of seat member 126 at a position which is a measure of the air flow necessary to give the desired B. M. E. P. at the particular speed existing. If the rate of air flow actually existing is then the correct value, the relative positions of the valve 38 and the seat member 126 are such that the lands 40, 42 and 44 on the valve 38 close their associated ports and the throttle remains in its previous position. If, however, the rate of flow of air is too low, then the position of valve 38, which is a measure of the existing air flow, is displaced to the left, with respect to seat member 126, from the position shown in the drawing. The port 41 associated with the land 40 is now opened to permit the flow of fuel under high pressure from conduit 146 to conduit 148 and the left end of cylinder 142 in fluid motor 144. At the same time, the port associated with the land 42 is opened to permit the draining of fuel from the right end of cylinder 142 thru conduits 140 and 124 to the inlet side of pump 54. The pressure differential thereby applied to piston 146 causes it to move to the right, opening the throttle 16. The opening movement of the throttle causes an increase in the air flow and a contraction of bellows 36, moving valve 38 to the right. This increase in air flow and movement of valve 38 continues until the lands 40, 42 and 44 close their respective ports.

It will be readily understood that if the air flow is too high for the selected B. M. E. P. and the existing engine speed, the bellows 36 displaces the valve 38 to the right with respect to the seat member 126 and the fluid motor 144 then responds to close the throttle 16 until the air flow is reduced to the proper value.

The fluid motor 114, which operates the rack 164 of the injector pumps, is controlled by the relative positions of valve 38 and seat member 108. The fluid motor 114 operates the injector pump racks to control the injector pump capacity so as to balance the fuel flow against the air flow, and maintain the fuel-to-air ratio at the desired value. The pressure drop across the jet system 64 is applied to the diaphragm 102 to position the seat member 108. The pressure differential across the jet system is therefore balanced against the rate of air flow. This fuel pressure differential is a true measure of the fuel flow only for a constant open cross-sectional area of the fuel flow path thru the jet system. The apparatus described therefore produces a substantially constant fuel-to-air ratio only so long as the cross-sectional area of the jet system open to the flow of fuel is not varied. Means have been provided to vary this cross-sectional area automatically under certain conditions or to vary it manually in order to control the fuel-to-air ratio.

Two devices are provided for automatically varying the open cross-sectional area of the fuel flow path thru the jet system. One of these is the idle jet valve 88 and the other is the enrichment valve 84. The idle jet valve 88 opens whenever the fuel pressure differential is below a predetermined small value corresponding to a low rate of air flow, so as to enrich the fuel-to-air ratio under idling conditions, and to permit the operation of the engine at lower idling speeds than is possible without increasing the richness of the mixture.

The manual mixture control unit permits the operator, by manipulation of shaft 76, to open an extra jet 92, thereby increasing the richness of the mixture. This is used under high power output conditions, as at take-off, or when climbing. The jet 92 is designed to give a fuel-to-air ratio selected for maximum power output.

The enrichment valve 84 opens at high fuel pressure differentials in order to increase the richness of the mixture under high engine power output conditions. The purpose of the enrichment valve is to decrease the operating temperature of the engine by enriching the mixture, and to decrease any tendency toward detonation. Also, if the jet 92 is closed, it automatically changes the fuel-to-air ratio toward the value for maximum power output, when the power output exceeds a predetermined value.

Figure 4:
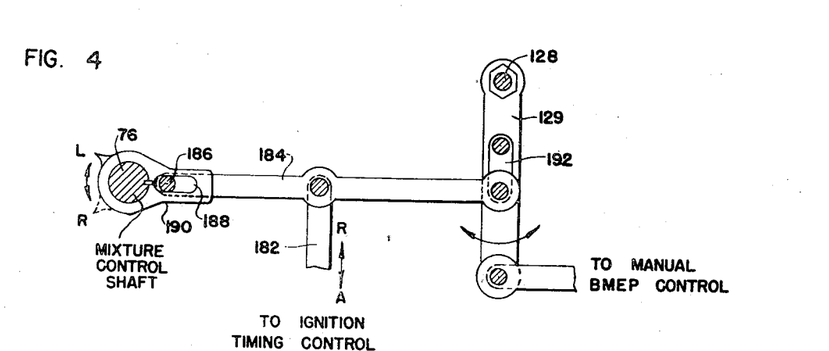
Figure 4 illustrates a linkage for connecting the B. M. E. P. control and the mixture control of Figure 1 to an ignition timing control device.

*Figure 4*

Figure 4 illustrates a linkage for interconnecting the mixture control shaft 76 and the manual B. M. E. P. control lever 129 of Figure 1 with an ignition timing control rod 182.

It is desirable to advance the ignition timing, if possible, when operating with a lean mixture in order to secure maximum economy and efficiency. When the engine is operating at idling speeds, however, it is necessary to retard the ignition timing in order to prevent a condition wherein ignition occurs before the piston reaches its top dead center, known as pre-ignition. It is also necessary to retard the ignition under high B. M. E. P. conditions to avoid detonation. These conditions may be met by operating the controls to advance the ignition timing when the B. M. E. P. is in an intermediate range of values, and to retard the ignition timing under high pressure conditions and also under low pressure conditions, which correspond to idling conditions.

In the arrangement shown in Figure 4, the ignition timing control rod 182 is pivotally attached at its upper end to the center of a floating lever 184. The left end of lever 184 carries a pin 186 operating in a slot 188 in an arm 190 attached to the mixture control shaft 76. The construction is such that when the mixture control shaft is moved counterclockwise from its lean to its rich position the pin 186 is moved upwardly, thereby carrying the lever 182 upwardly and retarding the ignition timing. Similarly, when the shaft 76 is moved in a clockwise direction from its rich to its lean position, the pin 186 is moved downwardly, thereby carrying the rod 182 downwardly and advancing the ignition timing.

The right end of lever 184 is pivotally attached to the lower end of a link 192, whose upper end is attached to an intermediate point on the lever 129. When the manual B. M. E. P. control is set at its most efficient position, the arm 129 is in the position illustrated in the drawing, so that the arm 192 is at its lowest point, and hence the right end of lever 184 is likewise at its lowest point, and the ignition timing control rod 182 is in its most advanced position, as far as the B. M. E. P. control is concerned. The lever 129 is pivoted about its upper end, as it appears in Figure 4. When it is rotated in either direction from the position shown in Figure 4, the link 192 and the right end of lever 184 are moved upwardly, thereby moving the ignition timing control rod 182 in a direction to retard the ignition timing.

Figure 5:
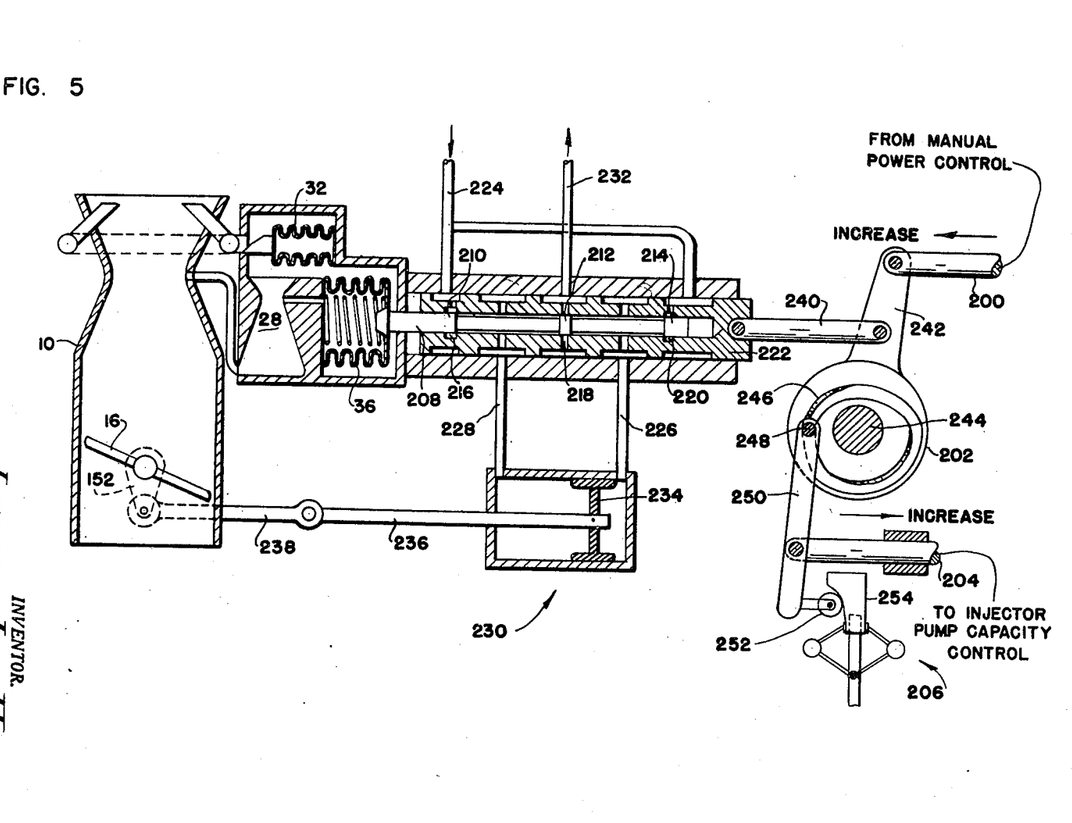
Figure 5 illustrates the modified form of fuel and combustion air control apparatus which may be used in place of the control apparatus of Figure 1, Figures 6 and 7 illustrate modified forms of altitude and temperature compensating devices which may be used in place of the altitude compensating device of Figures 1 and 5.

*Figure 5*

There is illustrated in Figure 5 a modified form of air and fuel flow control apparatus, wherein the manual control lever is used to set the horsepower output of the engine, rather than its B. M. E. P. In this arrangement, the throttle is controlled to set the air flow at a value determined by the position of a manually movable lever 200. The same manual lever 200 operates thru a cam 202, which acts thru a follower 248, a lever 250 and a rod 204 to shift the capacity control rack of the injector pump mechanism. The injector pump rack sets the capacity per stroke of the pump and hence the quantity of fuel flowing to the engine per revolution. However, in order to maintain a constant fuel-to-air ratio, it is necessary to balance the fuel flow per unit time against the air flow per unit time regardless of the number of engine revolutions per unit time. Therefore, a governor 206 is provided to compensate the injector pump capacity setting for variations in engine speed.

In the arrangement shown in Figure 5, the air induction passage 10, the boost venturi 28, the altitude compensating bellows 32, and the air flow measuring bellows 36, all correspond to their counterparts in Figure 1, and will not be further described.

The bellows 36 of Figure 5 positions a spool valve 208 having lands 210, 212 and 214 which cooperate with ports 216, 218 and 220, respectively, in a seat member 222.

The fuel supply conduit and its associated parts are not illustrated in Figure 5, and may be the same as those shown in Figure 1. The valve 208 and the seat member 222 together control the flow of fuel or other fluid from a high pressure conduit 224 selectively through conduits 226 and 228 to a fluid motor 230 and back to a drain conduit 232. The fluid motor 230 includes a piston 234 which operates a rod 236 connected by a link 238 to the arm 152 on the shaft of throttle 16. The control of the fluid motor 230 by the valve and seat member is generally similar to the control of fluid motor 144 by the valve 38 and seat member 126 of Figure 1. The right end of seat member 222 is attached to a link 240 whose opposite end is attached to an arm 242 mounted on a shaft 244. The arm 242 is pivotally attached at its end to the lever 200 for operation thereby. Arm 242 carries a cam disc 202 having a groove 246 in its surface. A pin 248 mounted on one end of a lever 250 rides in the groove 246. The lever 250 is pivotally attached at an intermediate point to the rod 204 connected to the injector pump racks. The lower end of lever 250 carries a roller follower 252 which cooperates with a cam 254 positioned by the governor 206 driven by the engine.

Operation of Figure 5

Movement of the manual lever 200 establishes the position of seat member 222. The relative positions of valve 208 and seat member 222 control the fluid motor 230 and hence the throttle 216 to establish a value of air flow which will cause valve 208 to move to a position with respect to seat member 222 where the flow of fluid to and from the motor 230 is cut off. For example, if the control lever 200 is moved to the left from the position shown in the drawing, the seat member 222 is likewise moved to the left. Fluid then flows from conduit 224 through port 220 and conduit 226 to the right end of the cylinder of fluid motor 230. At the same time, the left end of the cylinder of motor 230 is connected thru conduit 228 and port 212 to the train conduit 232. The pressure differential applied to piston 234 moves it to the left, thereby opening throttle 16 and increasing the air flow until the bellows 36 is collapsed sufficiently to move valve 208 to a position where the lands 212 and 214 again block the ports 218 and 220.

The same operation of lever 200 to the left causes the cam groove 246 to move pin 248 to the right, thereby increasing the injector pump capacity to correspond with the increased air flow.

If the engine speed increases as the result of the increased air and fuel flows, the governor 206 moves the cam 254 downward, thereby moving the lower end of lever 250 to the left, and decreasing the pump capacity so as to maintain the fuel flow substantially proportional to the air flow, regardless of the particular speed at which the engine operates.

Figure 6:
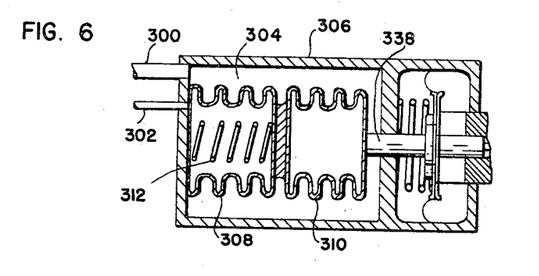

Figure 6

This figure illustrates a modified form of air pressure and temperature compensating device which may be used in place of the bellows 32 and valve 26 of Figure 1. In this arrangement, the air pressure differential set up by the boost venturi 28 is conveyed thru conduits 300 and 302. The pressure at the entrance to boost venturi 28 is communicated thru conduit 300 to a chamber 304 formed in a casing 306. The pressure at the throat of boost venturi 28 is communicated thru conduit 302 to the interior of a bellows 308 located in the chamber 304. An internal biasing spring 312 may be provided in bellows 308, if desired. The free end of bellows 308 carries a second bellows 310, which is sealed and which may be filled with a temperature responsive fluid, if desired. The free end of bellows 310 is attached to a valve 338, which may be the same as the valve 38 of Figure 1. In this manner, the variations in pressure and density of the flowing air cause expansions and contractions of bellows 310, and thereby change the distance between the valve 338 and the free end of the air flow measuring bellows 308.

For example, if the velocity of air flow remains the same while the air density increases, then the position of the free end of bellows 308 remains the same, but the bellows 310 is collapsed slightly, thereby moving valve 338 to the left. This is the same direction in which valve 338 would be moved by an increase in the velocity of air flow. The position of valve 338 is thereby made to reflect the mass of air flowing per unit time, rather than the velocity of the air flow.

Figure 7:
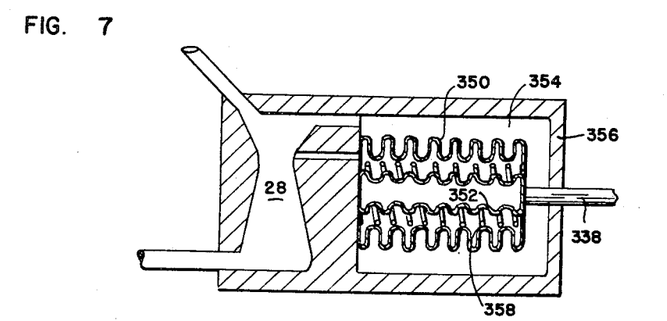

Figure 7

There is shown in this figure another modified form of air pressure and temperature compensating device. In this arrangement there are used two concentric bellows 350 and 352. Both of these bellows are mounted in a chamber 354 formed in a casing 356. The smaller bellows 352 is sealed. The space between the two bellows 350 and 352 is connected to the throat of boost venturi 28, while the chamber outside the bellows 350 is connected to the entrance of boost venturi 28. The free ends of the bellows 350 and 352 are attached to each other and are connected to a valve member 338, which may be the same as the valve 38 of Figure 1. A spring 358 may be used to bias the free ends of the bellows 350 and 352, if desired.

In this arrangement, changes in the pressure or temperature of the flowing air affect the bellows 352, and cause it to apply a corrective force to the valve 338. The two bellows are mechanically in parallel rather than being mechanically in series, as is the case shown in Figure 6.

Figure 8:
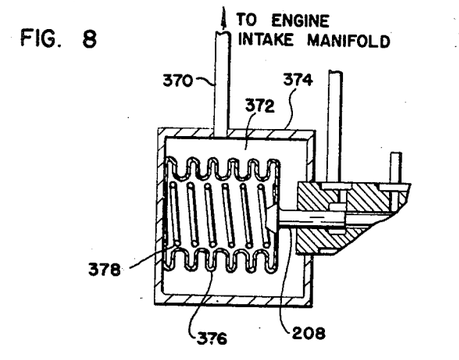
Figure 8 illustrates a manifold pressure responsive device which may be used in place of the air flow responsive device of Figure 5.

Figure 8

Figure 8 illustrates an intake manifold pressure responsive device which may be used in place of the air flow responsive bellows 36 of Figure 5 in case it is desired to use the intake manifold pressure as a measure of the engine power output, instead of using the air flow. The intake manifold pressure is not as good a measure of the engine power output as the air flow, but it is possible to use it without serious error, at least in certain operating ranges. Under idling conditions, the intake manifold pressure is not even an approximate indication of engine horsepower, due to a phenomenon known as "boost reversal." This "boost reversal" is an increase of manifold pressure with decreasing engine speed which is caused by the intake and exhaust valves being overlappingly open.

In the arrangement shown in Figure 8, the engine intake manifold pressure is communicated thru a conduit 370 to a chamber 372 in a casing 374. A sealed bellows 376 is mounted in the chamber 372 and has its free end attached to a valve 208, which may be the same as the valve 208 of Figure 5. A spring 378 may be used to bias the free end of bellows 376, if desired.

When the manifold pressure responsive control device of Figure 8 is used in the system of Figure 5, the throttle is operated to maintain a constant value of manifold pressure determined by the setting of the control lever 200. Under these conditions the governor 206 of Figure 5 is not needed, because a change in engine speed while the manifold pressure is maintained constant, changes both the air and fuel flows to substantially the same extent.

Figure 9:
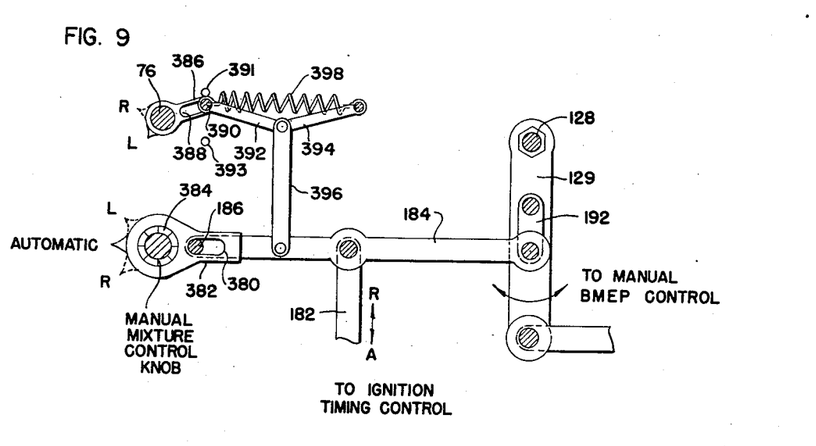
Figure 9 illustrates a modified form of interlocking linkage which may be used in place of that shown in Figure 4.

Figure 9

There is illustrated in this figure a modified form of the control linkage shown in Figure 4. In the arrangement shown in Figure 9, means are provided to selectively position the mixture control shaft 76 either in accordance with the setting of the B. M. E. P. control or independently thereof. In Figure 9, those elements which correspond to equivalent elements in Figure 4 have been given the same reference numerals, and those elements will not be additionally described.

The pin 186 at the left end of lever 184 moves in a slot 380 in an arm 382 which may be positioned by a knob 384. An arm 386 is attached to the mixture control shaft 76, and is provided with a slot 388. A pin 390, located at one end of a pair of toggle links 392 and 394, moves in the slot 386. The links 392 and 394 are pivoted together and to a connecting link 396. The opposite ends of the links 392 and 394 are connected by a spring 398. The right end of link 394 is fixed, and the left end of link 392 moves between a pair of stops 391 and 393.

When the knob 380 is in the position illustrated in the drawing, the mixture control shaft 76 is positioned by the movement of the B. M. E. P. control arm 129. As the right end of lever 184 moves upwardly, the connecting link 396 is moved upwardly until the toggle links 392 and 394 go over center, whereupon the spring 398 snaps the links to a position wherein link 392 engages stop 393, thereby moving the mixture control shaft 76 clockwise to its rich position. Similarly, when the shaft 76 is in its rich position and the right end of lever 184 is moved downwardly, the shaft 76 is moved to its lean position as soon as the toggle links go past the center position wherein they are aligned with the spring 398.

When the mixture control knob 384 is moved counterclockwise to the dotted position marked R in the drawing, the left end of lever 184 and the link 396 are moved upwardly until the toggle mechanism goes over center and moves the mixture control shaft 76 to the rich position. The various links are so proportioned that when the left end of lever 184 is so moved upwardly, the downward movement of the right end of lever 184 by the B. M. E. P. control mechanism cannot cause a movement of the shaft 76 to its lean position. Likewise, when the manual mixture control knob is moved to the dotted line position marked L in the drawing, the mixture control shaft 76 is moved to its lean position and the B. M. E. P. control cannot then move it to its rich position.

It is desirable to have the fuel-to-air ratio lean when the ignition timing is advanced and to have the fuel-to-air ratio rich when the ignition timing is retarded. When the knob 384 is set in automatic position those conditions of operation are maintained. However, by manipulating the knob 384, the mixture control may be positively moved to its rich or lean positions regardless of the position of the B. M. E. P. control, if such operation is found to be desirable. When the mixture control is manually set, the ignition timing control is given a fixed adjustment in a corresponding direction, altho it is still varied with the setting of the B. M. E. P. control.

Altho my invention has been described as applied to a fuel supply system of the type in which the fuel is injected as a liquid directly into the cylinder head, it could be applied with equal facility to a system of the type in which the fuel and air are mixed before being drawn or forced into the engine. For example, the fluid motor 114 could be used in such an arrangement to position a suitable fuel flow controlling valve mechanism.

While I have shown and described certain preferred embodiments of my invention, other modifications thereof will readily occur to those skilled in the art, and I therefore intend my invention to be limited only by the appended claims.

I claim as my invention:

1. Control apparatus for an internal combustion engine, comprising throttle means for controlling the flow of combustion air to said engine, means for controlling the flow of fuel to said engine, a control member, means for setting said member at a position indicative of the speed of said engine, means responsive to the rate of air flow to said engine, means responsive to the rate of fuel flow to said engine, means including said air flow responsive means and said fuel flow responsive means for operating said fuel flow control means, and means including said air flow responsive means and said control member for operating said throttle.

2. Control apparatus for an internal combustion engine, comprising throttle means for controlling the flow of combustion air to said engine, first fluid motor means for operating said throttle means, means for controlling the flow of fuel to said engine, second fluid motor means for operating said fuel flow controlling means, means responsive to the rate of flow of air to said engine, first and second control valve means connected to said air flow responsive means to be simultaneously positioned thereby, first seat means cooperating with said first valve means, means for positioning said first seat means in accordance with the speed of said engine, means including a manually movable control member for varying the relationship between engine speed and the position of said first seat means, a source of fluid under pressure, means including said first valve means and said first seat means for controlling the flow of fluid from said source to said first motor means to operate said throttle means to control the air flow in proportion to the engine speed and thereby to maintain a value of brake mean effective pressure determined by the position of said member, second seat means cooperating with said second valve means, means for positioning said second seat means in accordance with the rate of flow of fuel to said engine, and means including said second valve means and said second seat means for controlling the flow of fluid from said source to said second motor means to maintain said fuel flow substantially proportional to said air flow.

3. Control apparatus for an internal combustion engine, comprising throttle means for controlling the flow of combustion air to said engine, means for controlling the flow of fuel to said engine, means responsive to the rate of flow of air to said engine, a first control member, means for positioning said first control member in accordance with the speed of said engine, means including a manually movable control member for varying the relationship between engine speed and the positioning of said first control member, means including said air flow responsive means and said first control member for operating said throttle means to control the air flow in proportion to the engine speed and thereby to maintain a value of brake mean effective pressure determined by the position of said manually movable member, means responsive to the rate of flow of fuel to said engine, and means including said air flow responsive means and said fuel flow responsive means for operating said fuel flow control means.

4. Control apparatus for an internal combustion engine, comprising throttle means for controlling the flow of combustion air to said engine, means responsive to the rate of flow of air to said engine, a first control member, means for positioning said first control member in accordance with the speed of said engine, means including a manually movable control member for varying the relationship between engine speed and the position of said first control member, and means including said air flow responsive means and said first control member for operating said throttle means in an opening direction in response to increasing speed or decreasing air flow and in a closing direction in response to decreasing speed or increasing air flow to control the air flow in proportion to the engine speed and thereby to maintain a value of brake mean effective pressure determined by the position of said manually movable member.

5. Control apparatus for an internal combustion engine, comprising throttle means for controlling the flow of combustion air to said engine, means responsive to the rate of flow of air to said engine, a control member, means for positioning said member in accordance with the speed of the engine, and means including said air flow responsive means and said control member for operating said throttle means in an opening direction in response to increasing speed or decreasing air flow and in a closing direction in response to decreasing speed or increasing air flow.

6. Control apparatus for an internal combustion engine, comprising throttle means for controlling the flow of combustion air to said engine, motor means for operating said throttle means, means responsive to the rate of flow of air to said engine, a first control member, means for positioning said first control member in accordance with the speed of said engine, means including a manually movable control member for varying the relationship between engine speed and the position of said first control member, a source of energy for said motor means, and means including said air flow responsive means and said first control member for controlling the supply of energy from said source to said motor means to operate said throttle means in an opening direction in response to increasing speed and in a closing direction in response to decreasing speed to control the air flow in proportion to the engine speed and thereby to maintain a value of brake mean effective pressure determined by the position of said manually movable member.

7. Control apparatus for an internal combustion engine, comprising throttle means for controlling the flow of combustion air to said engine, first motor means for operating said throttle means, means for controlling the flow of fuel to said engine, second motor means for operating said fuel flow controlling means, means responsive to the rate of flow of air to said engine, first and second pairs of relatively movable control elements, means connecting one of each of said pairs of elements to said air flow responsive means to be simultaneously positioned thereby, means for positioning the other of said first pair of elements in accordance with the speed of said engine, means including a manually movable control member for varying the relationship between engine speed and the position of said other element, a source of energy for said motor means, means including said first pair of control elements for controlling the supply of energy from said source to said first motor means to operate said throttle means to maintain a value of brake mean effective pressure determined by the position of said member, means for positioning the other of said second pair of elements in accordance with the rate of flow of fuel to said engine, and means including said second pair of control elements for controlling the supply of energy from said source to said second motor means to maintain said fuel flow proportional to said air flow.

8. Control apparatus for an internal combustion engine, comprising throttle means for controlling the rate of flow of combustion air to said engine, means responsive to the rate of air flow for operating said throttle means to maintain said air flow substantially constant, manually operable means for varying the setting of said air flow responsive means, fuel flow control means, and cam means connecting said fuel flow control means to said manually operable means for operation thereby so that the fuel-to-air ratio is varied as a predetermined function of the air flow.

9. Control apparatus for an internal combustion engine, comprising a conduit for combustion air flowing to said engine, a device to be actuated in accordance with the mass of air flowing thru said conduit per unit time, means associated with said conduit for producing two unequal pressures whose difference varies with the velocity of the flowing air, an element subject on its opposite sides to said pressures and moved thereby with a force proportional to the difference of said pressures, a sealed bellows having its exterior subject to one of said pressures so that it expands and contracts in accordance with variations in air density, motor means for positioning said device, control means for said motor means, and a mechanical connection between said element, said bellows and said control means so that said control means is positioned in accordance with the resultant of the forces produced by said element and said bellows.

10. Control apparatus for an internal combustion engine, comprising a conduit for combustion air flowing to said engine, a device to be actuated in accordance with the mass of air flowing thru said conduit per unit time, means associated with said conduit for producing two unequal pressures whose difference varies with the velocity of the flowing air, a first bellows having its interior subject to one of said pressures and its exterior subject to the other of said pressures so that it expands and contracts in accordance with said velocity, said bellows having one end fixed and the other end free, a second bellows sealed and mounted on the free end of said first bellows so that its exterior is subject to said other pressure and it expands and contracts in accordance with variations in air density, and means including both of said bellows for positioning said device.

11. Control apparatus for an internal combustion engine, comprising a conduit for combustion air flowing to said engine, a device to be actuated in accordance with the mass of air flowing thru said conduit per unit time, means associated with said conduit for producing two unequal pressures whose difference varies with the velocity of the flowing air, a pair of concentric bellows, the outer bellows having its interior subject to one of said pressures and its exterior subject to the other of said pressures so that it expands and contracts in accordance with said velocity, the inner bellows being sealed and having its exterior subject to said other pressure so that it expands and contracts in accordance with variations in air density, and means including both of said bellows for positioning said device.

12. Control apparatus for an internal combustion engine, comprising a conduit for combustion air flowing to said engine, a device to be actuated in accordance with the mass of air flowing thru said conduit per unit time, means associated with said conduit for producing two unequal pressures whose difference varies with the velocity of the flowing air, a first bellows having its interior subject to one of said pressures and its exterior subject to the other of said pressures so that it expands and contracts in accordance with said velocity, a second bellows sealed and having its exterior subject to one of said pressures so that it expands and contracts in accordance with variations in air density, and means including both of said bellows for positioning said device.

13. Control apparatus for an internal combustion engine, comprising mixture control means including a member movable between a first position wherein said mixture control means establishes a lean fuel-to-air ratio and a second position wherein said mixture control means establishes a rich fuel-to-air ratio, a control device associated with said engine and movable thru a range of positions, mechanical means connecting said device and said member for concurrent movement, a manually movable element associated with said mechanical means and movable between a first position wherein said member moves with said control device and a second position wherein the position of said member is fixed by the position of said element.

14. Control apparatus for an internal combustion engine, comprising mixture control means including a member movable between a first position wherein said mixture control means establishes a lean fuel-to-air ratio and a second position wherein said mixture control means establishes a rich fuel-to-air ratio, a toggle mechanism connected to said member, means for driving said toggle including a floating lever and a link connected between said toggle and a point on said lever spaced from the center thereof, means for controlling the brake mean effective pressure of said engine, a connection between said brake mean effective pressure control means and the end of said lever farthest from said point, said brake mean effective pressure control means being capable of moving said farthest end over a limited range of movement, a manually movable control element, a connection between said element and the end of said lever nearest said point, said element and its associated connection being effective to move said nearest end between a first position wherein the range of movement of said farthest end is sufficient to operate said member thru said toggle, and a second position wherein said range of movement is not sufficient to operate said member.

15. Control apparatus for an internal combustion engine, comprising a conduit for combustion air flowing to said engine, a throttle for controlling the flow of air thru said conduit, a hydraulic servo-motor for positioning said throttle, control means for said servo-motor including a movable valve member and a movable seat member associated with said valve member, a manually movable element for positioning one of said members, means responsive to the rate of flow of air thru said conduit for positioning of the other of said members, said servo-motor being effective upon displacement of said members from predetermined relative positions with respect to each other to move said throttle and thereby to vary the rate of air flow in a sense to cause movement of said other member to its predetermined relative position with respect to said one member, fuel injector pump mechanism for delivering fuel to said engine and driven by said engine at a speed bearing a fixed ratio to the speed of said engine, means for varying the delivery per stroke of said pump mechanism, and means for controlling said delivery varying means including a first control device responsive to the position of one of said members to vary said delivery per stroke as a function of the rate of combustion air flow and a second control device for varying said delivery per stroke as an inverse function of the speed of said engine.

16. Control apparatus for an internal combustion engine, comprising a conduit for combustion air flowing to said engine, a throttle for controlling the flow of air thru said conduit, motor means for positioning said throttle, control means for said motor means including a pair of movable control members having normal positions relative to each other in which said motor means is stationary and effective upon relative movement from said normal positions in opposite senses to cause operation of said motor means in opposite directions, a manually movable element for positioning one of said members, means responsive to the rate of flow of air thru said conduit for positioning of the other of said members, said motor means being effective upon displacement of said members from said normal relative positions to move said throttle and thereby to vary the rate of air flow in a sense to cause movement of said other member to its normal relative position with respect to said one member, fuel injector pump mechanism for delivering fuel to said engine and driven by said engine at a speed bearing a fixed ratio to the speed of said engine, means for varying the delivery per stroke of said pump mechanism, and means for controlling said delivery varying means including a first control device responsive to the position of one of said members to vary said delivery per stroke as a function of the rate of combustion air flow and a second control device for varying said delivery per stroke as an inverse function of the speed of said engine.

17. Control apparatus for an internal combustion engine, comprising a conduit for combustion air flowing to said engine, a throttle for controlling the flow of air thru said conduit, a hydraulic servo-motor for positioning said throttle, control means for said servo-motor including a movable valve member and a movable seat member associated with said valve member, a manually movable element for positioning said seat member, means responsive to the rate of flow of air thru said conduit for positioning said valve member, said servo-motor being effective upon displacement of said members from predetermined relative positions with respect to each other to move said throttle and thereby to vary the rate of air flow in a sense to cause movement of said valve member to its predetermined relative position with respect to said seat member, fuel injector pump mechanism for delivering fuel to said engine and driven by said engine at a speed bearing a fixed ratio to the speed of said engine, means for varying the delivery per stroke of said pump mechanism, and means for controlling said delivery varying means including a first control device responsive to the position of said manually movable element to vary said delivery per stroke as a function of the rate of combustion air flow and a speed-controlled governor mechanism for varying said delivery per stroke as an inverse function of the speed of said engine.

18. Control apparatus for an internal combustion engine, comprising a conduit for combustion air flowing to said engine, a throttle for controlling the flow of air thru said conduit, a hydraulic servo-motor for positioning said throttle, control means for said servo-motor including a movable valve member and a movable seat member associated with said valve member, a manually movable element for positioning said seat member, means responsive to the rate of flow of air thru said conduit for positioning said valve member, said servo-motor being effective upon displacement of said members from predetermined relative positions with respect to each other to move said throttle and thereby to vary the rate of air flow in a sense to cause movement of said valve member to its predetermined relative position with respect to said seat member, fuel injector pump mechanism for delivering fuel to said engine and driven by said engine at a speed bearing a fixed ratio to the speed of said engine, means for varying the delivery per stroke of said pump mechanism, and means for controlling said delivery varying means including said air flow responsive means to vary said delivery per stroke as a function of the rate of combustion air flow and means responsive to the rate of flow of fuel to said pump mechanism for varying said delivery per stroke as an inverse function of the speed of said engine.

19. Control apparatus for an internal combustion engine, comprising first and second control devices to be positioned to control operating conditions of said engine, first and second hydraulic motor means for positioning said first and second control devices, respectively, first and second valve mechanisms for controlling said first and second motor means, respectively, each said valve mechanism comprising relatively movable valve and seat members, first and second means for moving one of the members of said first and second valve mechanisms, respectively, each said moving means being operable in either direction at any position of the other member of its associated valve mechanism, and means responsive to an operating condition of said engine for moving the other members of both said valve mechanisms simultaneously.

20. Control apparatus as in claim 19, in which said first control device is a throttle for controlling the flow of combustion air to said engine, said first moving means is manually operable, and said operating condition responsive means is responsive to the rate of flow of combustion air to said engine.

21. Control apparatus as in claim 19, in which said second control device includes an injection pump and means for controlling the delivery of fuel to said engine by said pump, said second moving means includes means for positioning said one member in accordance with the rate of flow of fuel to said engine, and said operating condition responsive means is responsive to the rate of flow of combustion air to said engine.

22. Control apparatus as in claim 19, in which said first and second valve mechanisms comprise two valve sections formed in tandem on a single stem, and a pair of separately movable sleeves surrounding said stem, each sleeve forming a seat for one of said valve sections.

23. Control apparatus as in claim 22, in which said valve sections are of the spool type and said sleeves are slidable lengthwise of their respective valve sections.

24. Control apparatus comprising first and second load devices to be positioned, first and second hydraulic motor means for positioning said first and second load devices, respectively, first and second valve mechanisms for controlling said first and second motor means, respectively, each said valve mechanism comprising relatively movable valve and seat members, first and second means for moving one of the members of said first and second valve mechanisms, respectively, each said moving means being operable in either direction at any position of the other member of its associated valve mechanism, and means responsive to a third condition for moving said other members of both said valve mechanisms simultaneously.

25. Control apparatus as in claim 24, in which said first and second valve mechanisms comprise two valve sections formed in tandem on a single stem, and a pair of separately movable sleeves surrounding said stem, each sleeve forming a seat for one of said valve sections.

26. Control apparatus as in claim 25, in which said first and second moving means are each connected to one of said sleeves, and said third condition responsive means is connected to said valve stem.

LEIGHTON LEE, II.

REFERENCES CITED

The following references are of record in the file of this patent:

UNITED STATES PATENTS

| Number | Name | Date |
|---|---|---|
| 2,138,100 | Howard | Nov. 29, 1938 |
| 2,179,628 | Heinzelmann | Nov. 14, 1939 |
| 2,217,364 | Halford et al. | Oct. 8, 1940 |
| 2,248,314 | Vatter | July 8, 1941 |
| 2,330,650 | Weiche | Sept. 28, 1943 |
| 2,397,835 | Brame | Apr. 2, 1946 |
| 2,416,797 | Dodson | Mar. 4, 1947 |
| 2,419,171 | Simpson et al. | Apr. 15, 1947 |

FOREIGN PATENTS

| Number | Country | Date |
|---|---|---|
| 349,209 | Great Britain | May 28, 1931 |
| 475,477 | Great Britain | Nov. 19, 1937 |
| 113,026 | Australia | May 2, 1941 |
| 839,931 | France | Jan. 7, 1939 |

OTHER REFERENCES

Ser. No. 281,826, Stieglitz et al. (A. P. C.), published May 18, 1943.